No. 617,272. Patented Jan. 3, 1899.
C. W. BEMAN.
BICYCLE VALVE.
(Application filed Feb. 14, 1898.)
(No Model.)
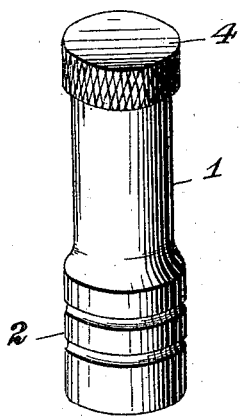
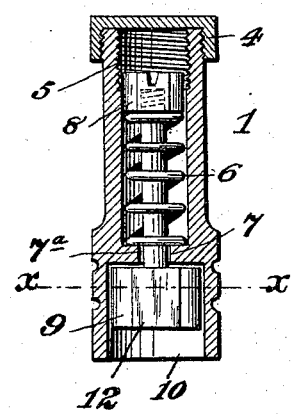
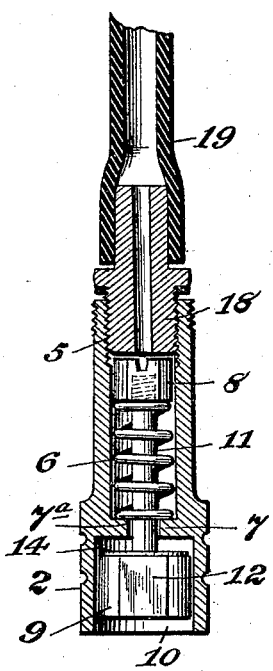
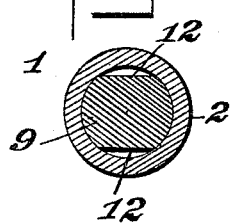
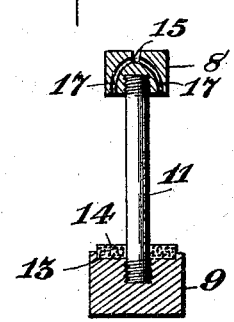
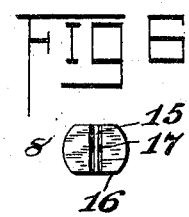
Witnesses:
Sam'l R. Turner
C. C. Hines
Inventor:
Clifford W. Beman,
By R. S. & A. B. Lacey,
His Attorneys.
THE NORRIS PETERS CO., PHOTO-LITHO., WASHINGTON, D. C.

UNITED STATES PATENT OFFICE.

CLIFFORD W. BEMAN, OF PORT DICKINSON, NEW YORK.

BICYCLE-VALVE.

SPECIFICATION forming part of Letters Patent No. 617,272, dated January 3, 1899.

Application filed February 14, 1898. Serial No. 670,279. (No model.)

*To all whom it may concern:*

Be it known that I, CLIFFORD W. BEMAN, a citizen of the United States, residing at Port Dickinson, in the county of Broome and State of New York, have invented certain new and useful Improvements in Valves; and I do hereby declare the following to be a full, clear, and exact description of the invention, such as will enable others skilled in the art to which it appertains to make and use the same.

This invention relates to certain new and useful improvements in valves designed especially for use in connection with the pneumatic tires of bicycles.

One of the greatest disadvantages of the present bicycle resides in the valve for inflating the pneumatic tires, it being well known that in a majority of cases said valves are liable to leak and afford considerable annoyance and inconvenience if not to temporarily disable the machine and render it unfit for use. This is primarily due to the fact that in the ordinary construction of valves the valve itself is unseated by the pressure of the air from the pump against the tension of its spring, the spring being light enough to permit of this being done, but too light to positively insure the closing of the valve under all circumstances after inflation, so that the valve frequently sticks while unseated or does not effect an air-tight closure against its seat.

It is therefore the object of this invention to provide a simple and reliable valve which is not subject to disarrangement and which comprises few parts so combined and arranged as to insure their proper operation; also, to provide a valve device in which the valve is unseated and held unseated during the inflating operation by the pump nipple or fitting and closed after said pump-fitting has been removed by a stiff spring, which securely holds the valve to its seat and prevents the escape of air.

With the above object in view the invention consists in certain novel features and details of construction and arrangement of parts, as will be hereinafter more fully described, and particularly pointed out in the claim hereto appended.

In the accompanying drawings, Figure 1 is a perspective view of a valve constructed in accordance with my invention. Fig. 2 is a longitudinal section of the same. Fig. 3 is a similar view showing the pump-nipple applied to unseat the valve and force air therethrough. Fig. 4 is a cross-section on line $x\ x$ of Fig. 2. Fig. 5 is a sectional view of the valve detached. Fig. 6 is plan view of the head.

Referring to the drawings, 1 designates a tubular valve-casing, which is of cylindrical form and provided at its base with an enlarged portion 2, which is formed with annular grooves to enable it to be firmly secured to the rubber stem of a pneumatic tire in a manner well understood by those conversant with the art to which this invention appertains. Upon the outer end of this casing is fitted a screw-cap 4, which may be exteriorly roughened or milled to facilitate its removal when necessary. This end of the casing is interiorly screw-threaded, as at 5. Arranged within the casing is a coiled spiral spring 6, one end of which bears against an annular seat 7 at the junction of the parts 1 and 2 of the casing, the outer end of said spring pressing against the head 8 of the valve proper, 9, working in an enlarged cavity 10 in the inner enlarged end 2 of the casing, as clearly shown in Fig. 2. The valve proper, 9, and the head 8 are connected by a centrally-arranged stem 11, which extends longitudinally within the casing and through an opening $7^a$ in the seat or diaphragm 7.

The valve 9 is substantially cylindrical in form and fits snugly within the portion 2 of the casing, and in order to allow the passage of the air by the valve after it has passed through the opening $7^a$ at the junction of the parts 1 and 2 said valve is provided on opposite sides with grooves or flattened surfaces, as shown at 12. The valve is also provided in its inner face with an annular cavity 13, in which is placed a packing-washer or rubber disk 14, adapted to press firmly against the diaphragm at the junction of the parts 1 and 2 of the casing, so that when the valve is acted upon by the spring 6 an air-tight joint will be provided for preventing the escape of air from the tire.

For the purpose of readily removing the valve for repairing the same or applying a new packing-washer the stem 11 may have a threaded connection with the valve or head 8, or both, as shown, and the said head 8 may be provided with a screw-driver-receiving groove or nick 15. It is also provided with grooves or flattened faces 16 at opposite sides and slots or passages 17, which intersect said groove or nick for passage of air.

In operation the nipple 18 of the pump-tube 19 is inserted in the end of the valve-casing and screwed inward until it contacts with the head 8, when it acts to press the stem inward and unseat the valve, the spring being at the same time partially compressed. The same action upon the valve may be produced by a special fitting of pump arranged to fit over and around the casing 1. Upon the operation of the pump the air will be forced through the valve into the tire, and when the latter has become sufficiently inflated the pump is unscrewed, and thereupon the stiff spiral spring 6 presses the valve firmly to its seat and prevents any possibility of the air escaping around the valve.

The spring is stiff enough to resist compression under the pressure of air forced from any ordinary bicycle-pump and to positively seat the valve under all conditions. The valve is thereby prevented from sticking and is forced firmly against its seat. It will thus be seen that leakage of air from the tire is thereby effectually prevented.

It will of course be understood that changes in the form, proportion, and minor details of construction may be made within the scope of the invention without departing from the spirit or sacrificing any of the advantages thereof.

Having thus described the invention, what is claimed as new, and desired to be secured by Letters Patent, is—

A valve for pneumatic tires, comprising a casing screw-threaded exteriorly at its outer end and provided with a main chamber and a valve-chamber separated by a diaphragm, a valve in said valve-chamber adapted to seat against the diaphragm and provided on opposite sides thereof with feed passages or grooves and with a packing-ring arranged in a cavity therein, a stem connected to the valve and extending through the diaphragm into the main chamber, a head on the outer end of the stem closely fitting the main chamber and formed with feed-openings extending therethrough and with flattened feed faces or grooves on opposite sides thereof, a spring bearing against the head to normally hold the valve closed until the stem is positively moved inwardly by the pump-nipple, and a cap fitted upon the exteriorly-threaded outer end of the casing, substantially as described.

In testimony whereof I affix my signature in presence of two witnesses.

CLIFFORD W. BEMAN.

Witnesses:
A. HOUCK,
M. I. JONES.